United States Patent [19]

Ishizaki et al.

[11] Patent Number: 5,666,180
[45] Date of Patent: Sep. 9, 1997

[54] LIQUID CRYSTAL DISPLAY WITH REDUCED PARASITIC CAPACITANCE BETWEEN PIXEL ELEMENTS AND MATRIX WIRING ELEMENTS

[75] Inventors: Akira Ishizaki, Atsugi; Mamoru Miyawaki, Isehara; Shigeki Kondo, Hiratsuka, all of Japan

[73] Assignee: Canon Kabushiki Kaisha, Tokyo, Japan

[21] Appl. No.: 645,892

[22] Filed: May 14, 1996

Related U.S. Application Data

[63] Continuation of Ser. No. 432,267, May 1, 1995, abandoned, which is a continuation of Ser. No. 325,641, Oct. 19, 1994, abandoned, which is a continuation of Ser. No. 10,630, Jan. 28, 1993, abandoned.

[30] Foreign Application Priority Data

Jan. 30, 1992 [JP] Japan ............... 4-038463
Jan. 31, 1992 [JP] Japan ............... 4-041948

[51] Int. Cl.$^6$ ............. G02F 1/1343; G02F 1/1333
[52] U.S. Cl. ............. 351/58; 351/54; 351/87; 351/79
[58] Field of Search ............. 359/58, 59, 54, 359/87, 79; 340/719; 345/55

[56] References Cited

U.S. PATENT DOCUMENTS

| | | | |
|---|---|---|---|
| 4,470,667 | 9/1984 | Okubo et al. | 359/64 |
| 4,636,038 | 1/1987 | Kitahara et al. | 359/59 |
| 4,697,887 | 10/1987 | Okada et al. | 359/100 |
| 4,714,636 | 12/1987 | Yokono et al. | 359/68 |
| 4,744,637 | 5/1988 | Sekimura et al. | 359/79 |
| 4,795,239 | 1/1989 | Yamashita et al. | 359/59 |
| 4,838,652 | 6/1989 | Inaba et al. | 359/59 |
| 4,973,135 | 11/1990 | Okada et al. | 359/59 |
| 5,028,122 | 7/1991 | Hamada et al. | 359/59 |
| 5,113,181 | 5/1992 | Inoue et al. | 340/783 |

FOREIGN PATENT DOCUMENTS 464579 1/1992 European Pat. Off. ............ 359/59

OTHER PUBLICATIONS

Pat. Abs. Jp., vol.13, No.203, (P-870) May 15, 1989 & JP-A-01024232.
Pat. Abs. Jp., vol.12, No.492 (P-804) Dec. 22, 1988 & JP-A-63202719.
Pat. Abs. Jp., vol.15, No.426 (P-1269) Oct. 29, 1991 & JP-A-03175430.
Liquid Crystal TV Displays: Principles And Applications Of Liquid Crystal Displays, E. Kaneko, pp. 212–214, 1987 KTK Scientific Publishers/Tokyo.

*Primary Examiner*—Huy Mai
*Attorney, Agent, or Firm*—Fitzpatrick,Cella,Harper & Scinto

[57] ABSTRACT

A liquid crystal display having a plurality of sets of matrix wiring elements, a plurality of active elements and a liquid crystal layer includes a conductive layer for being maintained at a predetermined potential, which layer is selectively provided around each of pixel electrodes individually provided for each pixel. An image information processing apparatus includes such a liquid crystal display. The selective formation of the conductive layer makes it possible to reduce cross-talk while reducing the risk of the generation of unwanted parasitic capacitance and leakage current.

15 Claims, 7 Drawing Sheets

LIQUID CRYSTAL DISPLAY WITH REDUCED PARASITIC CAPACITANCE BETWEEN PIXEL ELEMENTS AND MATRIX WIRING ELEMENTS

This application is a continuation of application Ser. No. 08/432,267 filed May 1, 1995, now abandoned, which is a continuation of application Ser. No. 08/325,641 filed Oct. 19, 1994, now abandoned, which is a continuation of application Ser. No. 08/010,630 filed Jan. 28, 1993, now abandoned.

BACKGROUND OF THE INVENTION

1. Field of the Invention

The present invention relates to a liquid crystal display (LCD). Particularly, the present invention relates to a liquid crystal display in which individual pixel electrodes are provided for each of the pixels.

2. Related Background Art

A liquid crystal display of a matrix type used in an image information processing apparatus such as a video camera recorder or a television is driven by a drive system which is either a simple matrix drive system or an active matrix (AM) drive system. In an active matrix drive system, a switching active element is provided for each pixel so as to prevent a signal from being input to a pixel electrode during a non-select period thereby preventing a cross-talk phenomenon which might occur between scanning lines with a simple matrix drive system.

FIG. 1 shows a circuit equivalent to a circuit corresponding to one pixel of a liquid crystal display using an active matrix drive system. The circuit includes a liquid crystal layer 2 having a capacitance $C_{LC}$, a storage capacitance element 4 provided in parallel with the capacitance $C_{LC}$ and having a capacitance $C_{ADD}$, a metal-oxide semiconductor (MOS) transistor 6 serving as a switching active element, a signal line 8 for supplying driving voltage $V_S$ to the liquid crystal layer 2, and a gate line 10 for controlling a gate voltage $V_G$ of the switching transistor 6.

In such an active matrix liquid crystal display (AM-LCD), a parasitic capacitance $C_{GD}$ exists between the gate and the drain of the switching transistor 6. When the gate voltage $V_G$ shifts from a high level to a low level, the parasitic capacitance $C_{GD}$ causes a reduction in a voltage $V_{LC}$ applied to the liquid crystal, as shown in FIG. 2. That is, a voltage swing occurs. Such a reduction $\Delta V_{LC}$ is expressed by the following formula:

$$\Delta V_{LC} = [C_{GD}/(C_{GD}+C_{LC}+C_{ADD})] \cdot \Delta V_G$$

where $\Delta V_G$ represents a change in the gate voltage $V_G$

Image quality decreases if the swing $\Delta V_{LC}$ is great. Therefore, in order to improve image quality, it is preferable that the storage capacitance $C_{ADD}$ be as great as possible so that the swing $\Delta V_{LC}$ can be minimized. However, if the storage capacitance element 4 is formed by using an opaque material, such as that used in a gate line or an active layer of a switching transistor, so as to achieve a large storage capacitance $C_{ADD}$, the proportion of an opaque portion relatively increases, causing a corresponding reduction in the open area ratio. The use of a large storage capacitance $C_{ADD}$ is also disadvantageous in that it is necessary to increase the charging and discharging ability of the switching transistor 6, thereby requiring the use of a large-size transistor. A reduction in the open area ratio may be prevented by using a capacitance element made of an indium-tin oxide (ITO-ITO) material. However, since ITO can cause a relatively high resistance, it is necessary to reduce resistance by using an opaque metal wire such as an Al wire. Thus, the above method cannot be a fundamental solution to the problem of open-area ratio reduction.

There are capacitances other than the above $C_{GD}$ that can add to the parasitic capacitance; these include a capacitance $C_{GP}$ between the gate line 10 and the pixel electrode 16, and a capacitance $C_{SP}$ between the signal line 8 and the pixel electrode 16. These capacitances $C_{GP}$ and $C_{SP}$ can cause reductions in the voltage $V_{LC}$ applied to the liquid crystal as does the capacitance $C_{GD}$. The capacitance $C_{GP}$ causes a change corresponding to a change in the potential of the gate line 10, and the capacitance $C_{SP}$ causes a change corresponding to a change in the potential of the signal line 8.

The deterioration of display performance caused by these capacitances $C_{GP}$ and $C_{SP}$ becomes more and more conspicuous as displays are required to have higher and higher definition and gradation levels and pixels become more and more minute in order to realize televisions or the like adapted for a hi-definition system.

However, if this problem is to be overcome by increasing the space between the gate line and the pixel electrode and the space between the signal line and the pixel electrode, this necessitates a substantial increase in cell area. Since such increase contradicts the demand for higher definition, the above method is not suitable for the intended purpose.

SUMMARY OF THE INVENTION

In view of the above-described problems, a primary object of the present invention is to decrease the parasitic capacitance between, for instance, a gate line and a pixel electrode and a signal line and a pixel electrode, while increasing the open area ratio, and thus to enable displays having satisfactorily high levels of definition and gradation.

Another object of the present invention is to provide a liquid crystal display and an image information processing apparatus including such a liquid crystal display, the liquid crystal display having a plurality of sets of matrix wiring elements, a plurality of active elements and a liquid crystal layer, the liquid crystal display including a conductive layer selectively provided, for being maintained at a predetermined potential, around each of pixel electrodes individually provided for each of pixels.

According to the present invention, the selective formation of the conductive layer makes it possible to achieve the above object while reducing the risk of unwanted parasitic capacitance and leakage current being generated.

DETAILED DESCRIPTION OF THE PREFERRED EMBODIMENTS

A conductive layer used in the present invention is selectively provided around each of a plurality of pixel electrodes. The conductive layer is maintained at a predetermined potential so that the pixel electrode is prevented from being adversely effected by floating capacitance between the pixel electrode and matrix wiring elements or capacitance between lines.

In the film formation processing, such a conductive layer may be formed in either the same process as or a different process from the corresponding pixel electrode. Further, the conductive layer may be positioned below a peripheral portion of the pixel electrode or beside the pixel electrode or both.

The conductive layer need not be maintained at a fixed potential, and may be maintained at, for example, a binary potential, as is a gate selecting line among the matrix wiring elements.

Where the corresponding pixel electrode has a substantially rectangular configuration, the conductive layer is preferably provided along at least three of the four sides of the pixel-electrode configuration. Specifically, the conductive layer is preferably provided at least between the pixel electrode and a gate selecting line corresponding to the same pixel as the pixel electrode, between the pixel electrode and a signal line corresponding to the same pixel as the pixel electrode, and between the pixel electrode and another signal line corresponding to an adjacent pixel.

Embodiments of the present invention will now be described. It is to be understood, however, that the present invention is not intended to be limited by the embodiments but intended to include substitutions of various elements thereof and design changes made therein within the scope directed to the objects of the present invention.

(Embodiment 1)

Figure 1:
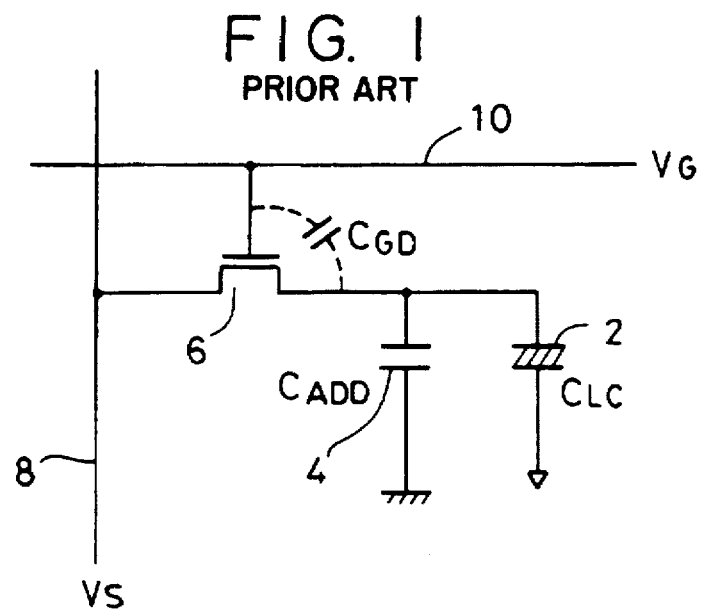
FIG. 1 is a diagram of a circuit equivalent to a circuit corresponding to one pixel of a conventional active matrix liquid crystal display (AM-LCD)
Figure 2:
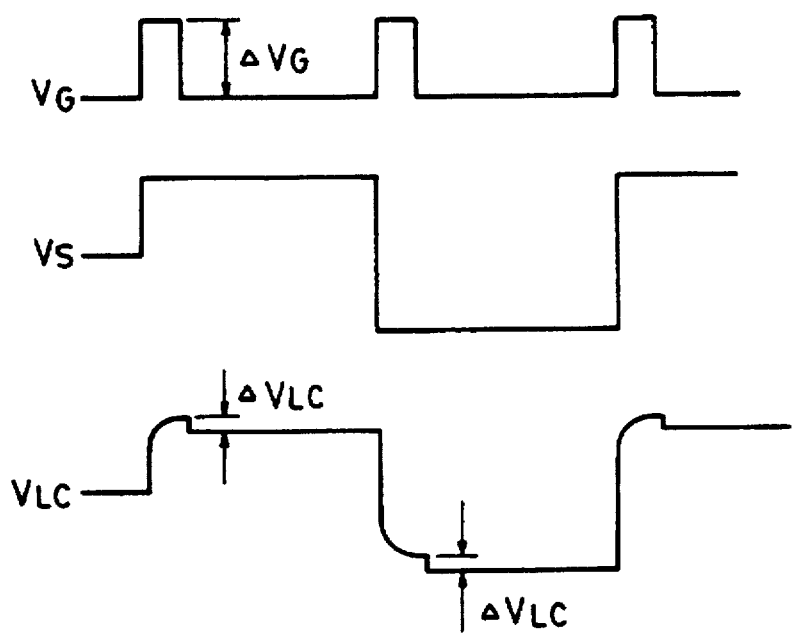
FIG. 2 is a timing chart showing drive waveforms for the liquid crystal display shown in FIG. 1.
Figure 3A:
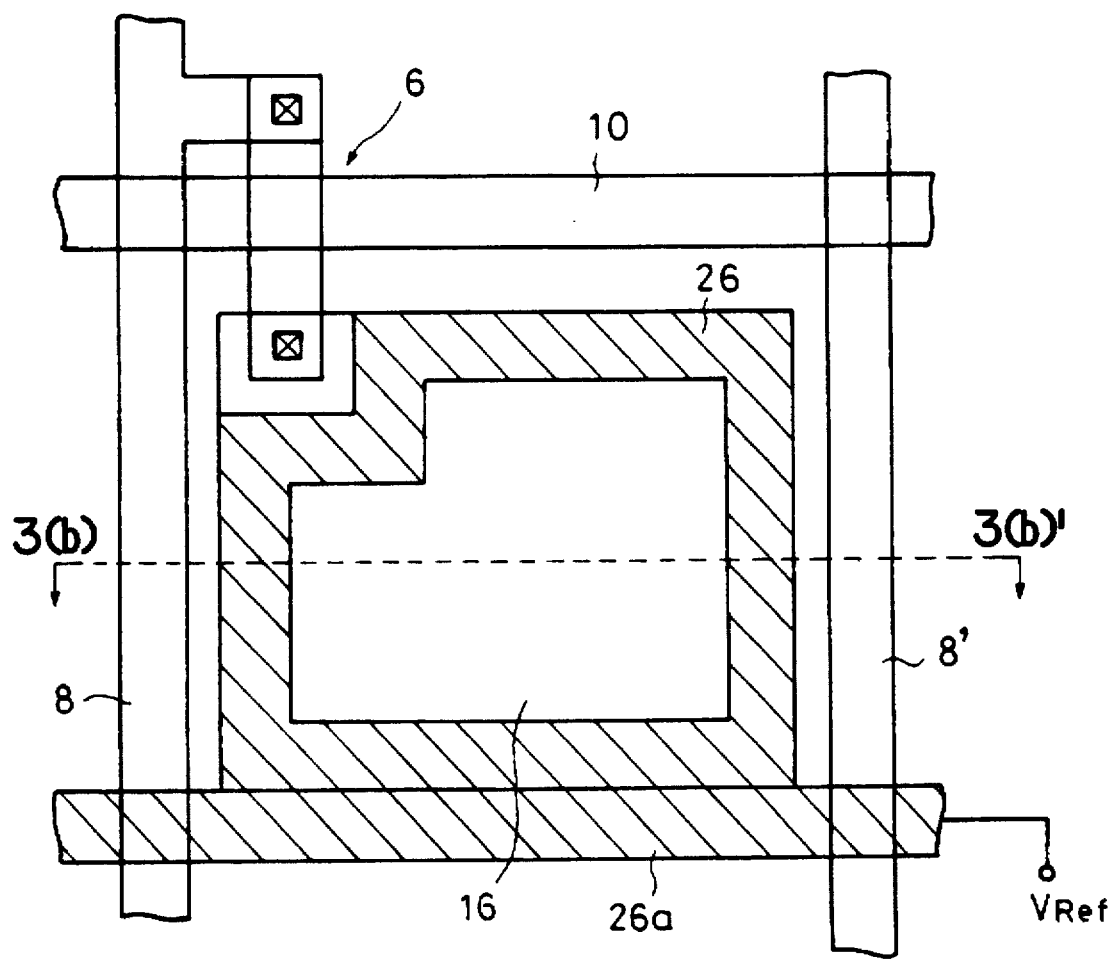
FIGS. 3(a) and 3(b) schematically show an AM-LCD according to a first embodiment of the present invention, FIG. 3(a) being a fragmentary plan view, and FIG. 3(b) being a sectional view taken along line 3(b)–3(b)' shown in FIG. 3(a)
Figure 3B:
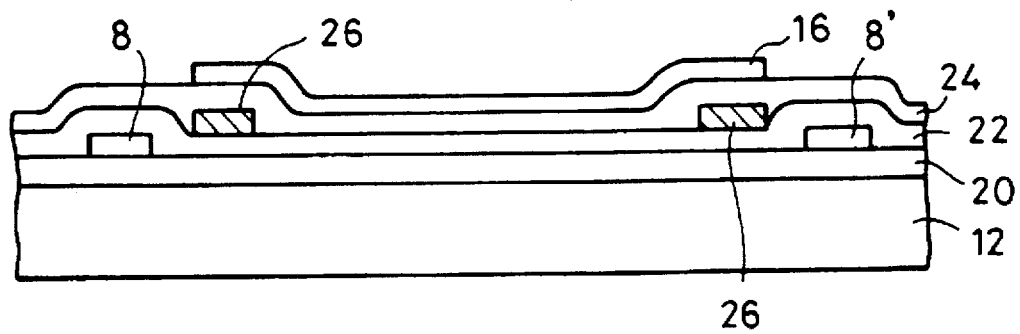

FIGS. 3(a) and 3(b) show an arrangement corresponding to one of a plurality of pixels of an active matrix liquid crystal display (AM-LCD) according to a first embodiment of the present invention, FIGS. 3(a) and 3(b) respectively showing a planar structure and a sectional structure of the arrangement.

Referring to these figures, the arrangement includes a MOS transistor 6 serving as a switching active element, a signal line 8, and a gate line 10 for controlling the gate voltage of the switching transistor 6, the gate line 10 serving as a gate selecting line among matrix wiring elements. The arrangement also includes a portion of a transparent substrate 12, a transparent pixel-electrode 16, and transparent insulating films 20, 22 and 24.

In Embodiment 1, a common potential wire 26 for storage capacitance is formed in a substantially ring-shaped configuration around the periphery of the pixel electrode 16. The storage capacitance wire 26 is connected to a reference voltage supply $V_{Ref}$ by a wire portion 26a so as to be maintained at a predetermined potential during a drive period of the corresponding pixel. Specifically, the storage capacitance wire 26 is maintained at the same potential as a common electrode which is maintained at a common potential with respect to all the pixels and which is provided on another substrate disposed in opposition to the pixel electrodes. Thus, in this embodiment, the storage capacitance wire 26 has a portion positioned between the pixel electrode 16, on one hand, and the signal line 8 or another signal line 8', on the other, so that a capacitance is formed between the wire 26 and the signal lines 8 and 8'. As a result, the parasitic capacitance $C_{SP}$ between the pixel electrode 16 and the signal line 8 or 8' is greatly decreased. The storage capacitance wire 26 has another portion positioned between the pixel electrode 16 and the gate line 10, so that a capacitance is formed between the wire 26 and the gate line 10, resulting in the parasitic capacitance $C_{GP}$ between the pixel electrode 16 and the gate line 10 being greatly decreased. Accordingly, a swing of a voltage $V_{LC}$ applied to the liquid crystal is greatly reduced, thereby enabling image quality to be improved. This possibility, in turn, makes it possible to decrease the storage capacitance value while the image quality is maintained. Hence, it is possible to accordingly reduce the size of the transistor 6 for charging and discharging the storage capacitance as well as the width of the storage capacitance wire 26, thereby enabling the open area ratio to be increased.

(Embodiment 2)

Figure 4A:
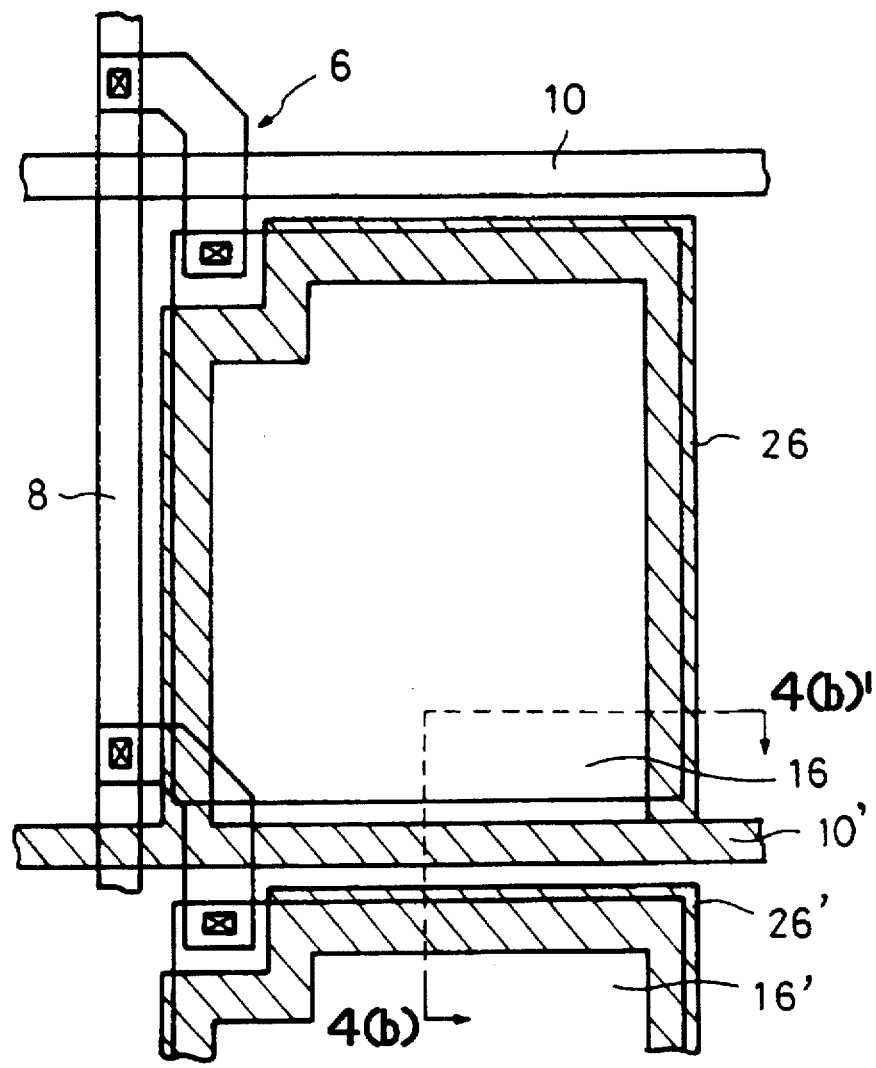
FIGS. 4(a) and 4(b) schematically show an AM-LCD according to a second embodiment of the present invention, FIG. 4(a) being a fragmentary plan view, and FIG. 4(b) being a sectional view taken along line 4(b)–4(b)' shown in FIG. 4(a)
Figure 4B:
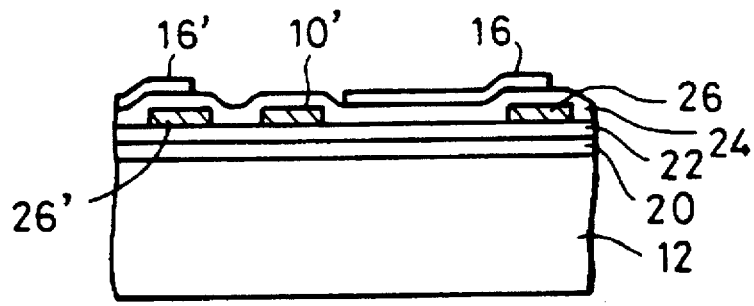

FIGS. 4(a) and 4(b) show an arrangement corresponding to one of a plurality of pixels of another AM-LCD according to a second embodiment of the present invention, FIGS. 4(a) and 4(b) respectively showing a planar structure and a sectional structure of the arrangement.

The construction of the second embodiment is basically the same as that of the first embodiment, and is distinguished therefrom in that a storage capacitance wire 26 is connected to a gate line 10' belonging to another pixel row, and that an outer edge portion of the wire 26 outwardly projects slightly beyond the outer edge of the corresponding pixel electrode 16.

In Embodiment 2, the gate line 10' is maintained at a certain potential during a time period during which the illustrated pixel row is driven by the gate line 10. Thus, similarly to the first embodiment, the second embodiment is also able to greatly decrease the parasitic capacitance $C_{SP}$ between the pixel electrode 16 and the signal line 8 as well as the parasitic capacitance $C_{GP}$ between the pixel electrode 16 and the gate line 10 for driving the corresponding pixel. Thus, the second embodiment provides effects similar to those of the first embodiment. According to the second embodiment, since the storage capacitance wire and the gate line can be simultaneously formed using the same material, the layer formation processing is facilitated.

(Embodiment 3)

Figure 5A:
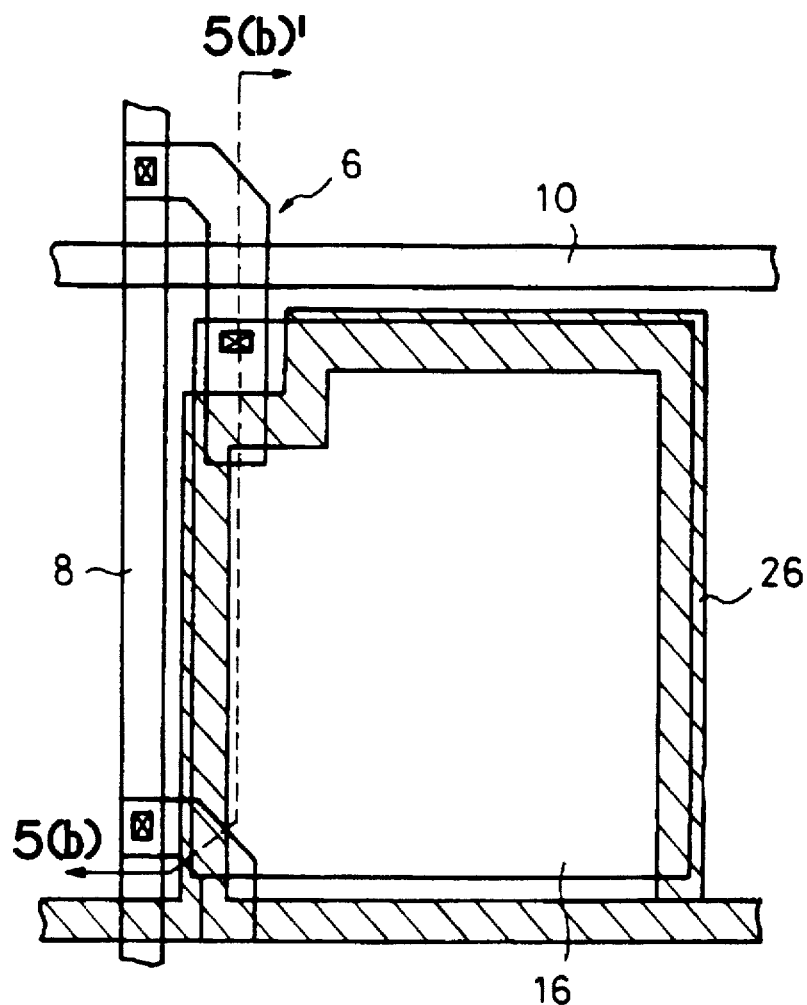
FIGS. 5 (a) and 5 (b) schematically show an AM-LCD according to a third embodiment of the present invention, FIG. 5(a) being a fragmentary plan view, and FIG. 5(b) being a sectional view taken along line. 5(b)–5(b)' shown in FIG. 5 (a)
Figure 5B:
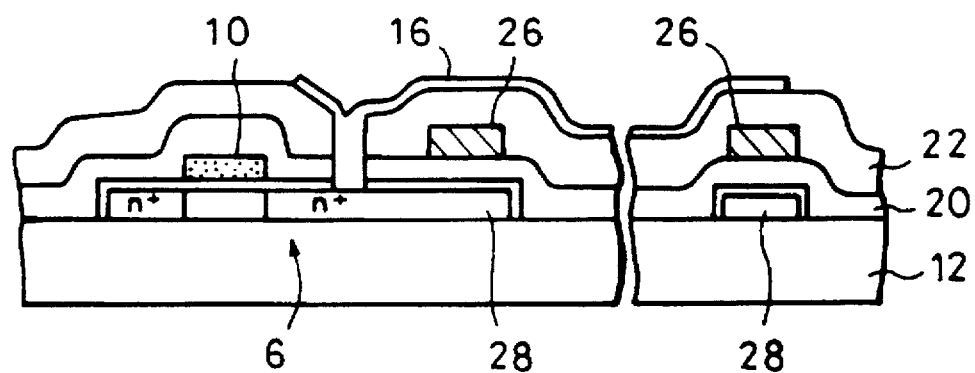

FIGS. 5(a) and 5(b) show an arrangement corresponding to one of a plurality of pixels of still another AM-LCD according to a third embodiment of the present invention, FIGS. 5(a) and 5(b) respectively showing a planar structure and a sectional structure of the arrangement.

The construction of the third embodiment is basically the same as that of the second embodiment, and is distinguished therefrom in the following points:

In Embodiment 3, while a common potential wire 26 for storage capacitance is formed as in Embodiment 2, a drain region 28 of a switching transistor 6 extends along a part of the outer periphery of the corresponding pixel electrode 16. This construction provides the following effects in addition to effects similar to those provided by Embodiments 1 and 2: Since an additional storage capacitance is formed between the wire 26 and the drain region 28, it possible to achieve a sufficient capacitance value even if the width of the wire 26 is reduced, thereby enabling a further increase in the open area ratio.

As described above, according to the first to third embodiments of the present invention, a common potential wire for storage capacitance is provided around the outer periphery of the corresponding pixel electrode. As a result, a swing of the liquid-crystal application voltage $V_{LC}$, which can be caused by voltage variations in the signal line or the gate line, is reduced, thereby improving image quality. This, in turn, makes it possible to decrease the storage capacitance value while the image quality is maintained, and hence, to accordingly reduce the size of the switching transistor as well as the width of the storage capacitance wire. Thus, it is possible to achieve a great open area ratio even when the storage capacitance wire is formed of an opaque material into a layer of Si or other metal. The effectiveness of the above embodiments of the present invention increase as the pixel size decreases.

(Embodiment 4)

Figure 6A:
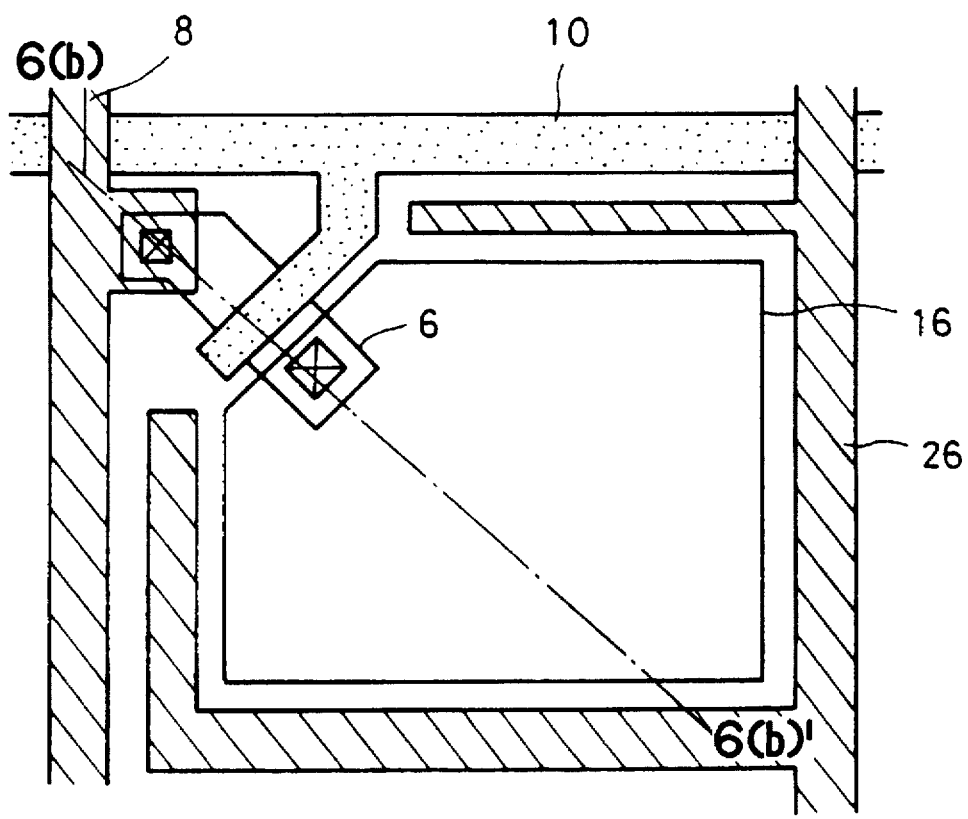
FIGS. 6(a) and 6(b) schematically show an AM-LCD according to a fourth embodiment of the present invention, FIG. 6(a) being a fragmentary plan view, and FIG. 6 (b) being a sectional view taken along line 6(b)–6(b)' shown in FIG. 6 (a)
Figure 6B:
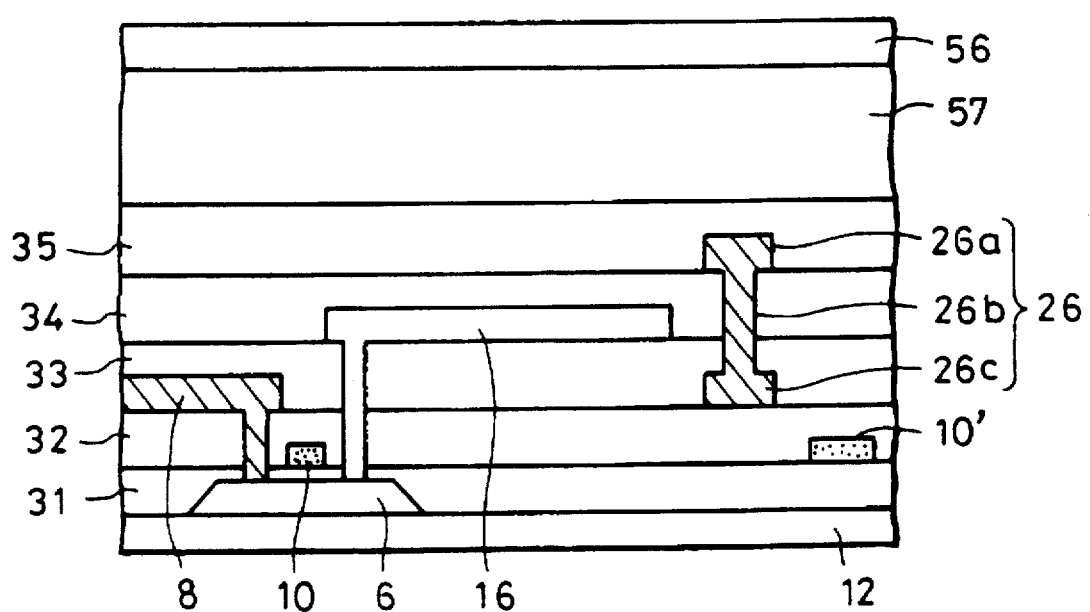

FIGS. 6(a) and 6(b) show an arrangement corresponding to one of a plurality of pixels of a further AM-LCD according to a fourth embodiment of the present invention, FIGS. 6(a) and 6(b) respectively showing a planar structure and a sectional structure of the arrangement.

Referring to these figures, the arrangement includes a gate line 10 for a pixel switch (a portion of the gate line 10 branching to form a gate electrode), a signal line 8 for writing an image signal in the corresponding pixel, and a MOS transistor 6 having semiconductor regions constituting a drain region, a channel region and a source region. The arrangement also includes a pixel electrode 16 for driving a portion of a liquid crystal layer 57, and a shielding wire 26 arranged between the pixel electrode 16, on one hand, and the gate line 10 or the signal line 8, on the other. Reference numeral 10' denotes another gate line corresponding to another pixel. Reference numerals 31, 32, 33, 34 and 35 denote transparent insulating layers.

When forming the shielding wire 26, it is composed of two or three sublayers at different levels. In the illustrated example, the shielding wire 26 has an upper sublayer 26a and a lower sublayer 26c. The upper sublayer 26a is formed after a contact hole is formed in the insulating layers 33 and 34 at a position above the lower sublayer 26c so that the upper and lower sublayers 26a and 26c are interconnected with each other through a contact hole portion 26b in the contact hole. Where the shielding wire 26 is to be composed of three-level sublayers, another sublayer to be disposed in a contact hole is formed in a step different from the step of forming an upper sublayer 26a.

The lower sublayer 26c, the contact hole portion 26b and the upper sublayer 26a are formed in such a manner as to surround the entire periphery of the pixel electrode 16 except for a portion of the pixel electrode 16 at which the pixel switch is formed. The contact hole opens in a linear form around the mated periphery of the pixel electrode 16. The lower sublayer 26c may be formed by patterning a conductive layer at the same level as a conductive layer (such as an aluminum wire) for forming the signal line 8.

The liquid crystal display shown in FIGS. 6(a) and 6(b) is driven in the following manner: When a potential corresponding to an image signal is applied to the signal line 8, and a potential for conducting the pixel switch is applied to the gate line 10, the pixel electrode 16 is brought to a predetermined potential. According to the common practice, such an operation of writing into pixel electrode 16 is performed simultaneously with respect to all pixel electrodes in one row. For this purpose, the gate lines of cells in one row are commonly connected. When a writing operation with respect to one row has been completed, another writing operation with respect to another (adjacent) row is performed by using the same signal line. For this purpose, the signal lines belonging to one column are commonly connected.

When line-by-line writing operations have been completed with respect to all rows, writing of one frame on the panel is completed. Therefore, after the writing in the last row has been completed, further writing operations start at the first row. Thus, images are continuously displayed. In order that the panel can display image information in this way, the signal line undergoes continuous variations in the potential. In addition, the gate line undergoes great variations in the potential so as to turn on and off the pixel switches.

In a conventional liquid crystal display, since a parasitic capacitance exists, as described before, between a pixel electrode and the gate line and between the pixel electrode and the signal line, changes in the potential of the pixel electrode include unwanted fluctuations, thereby lowering the contrast of images displayed and impairing the gradation thereof.

According to the above embodiment of the present invention, a shielding region, or the wire 26, is disposed around a pixel electrode and is maintained at a certain potential. Therefore, the influence of variations in the potential of the gate line and the signal line can be greatly reduced, thereby making it possible to improve image quality.

Although in the illustrated example the contact hole in the form of a linear opening and the contact hole portion 26b, as well as the lower and upper sublayers 26c and 26a, are formed in such a manner as to surround a certain peripheral portion of the corresponding pixel electrode 16, the contact hole and the contact hole portion 26b need not extend along the whole of that peripheral portion.

Next, a method of producing a liquid crystal display according to the fourth embodiment will be described.

First, active elements 6 are formed on a substrate 12 having an insulating surface by forming thereon a plurality of islands of a single-crystal semiconductor.

Subsequently, a gate insulating film 31 and a plurality of gate electrodes 10, 10' are formed. Then, another insulating layer 32 is formed. Thereafter, a contact hole, through which a main electrode region (source or drain) of each active element 6 is to connect with a signal line 8, is formed in the insulating layers 31 and 32.

After the formation of the contact holes, a conductor is deposited and patterned, thereby forming signal lines 8 and lower sublayers 26c simultaneously.

Thereafter, a third insulating layer 33 is formed. Then, another contact hole, through which each active element 6 is to contact a pixel electrode 16, is formed in the insulating layers 31, 32 and 33.

Subsequently, pixel electrodes 16 are formed by depositing and patterning a transparent conductor. Before this formation, the insulating layer 33 is subjected to a planarization process using a method such as a phosphosilicate glass re-flow method or a method comprising a combination of a spin-on glass step and an etch-back step, thereby planarizing the surface of the insulating layer 33.

Subsequently, the pixel electrodes 16 thus formed are covered with a fourth insulating layer 34. Then, a contact hole, through which each lower sublayer 26c is to contact an upper sublayer 26a, is formed in the insulating layers 33 and 34. Then, upper sublayers 26a are formed by depositing and patterning a conductor. Thereafter, a protecting layer 35 is formed, thereby completing a structure including one of a pair of substrates, between which a liquid crystal layer 57 will be held.

Subsequently, a structure including another substrate 56 and a common electrode thereon is prepared, and fixed in position with a prescribed gap defined between the substrate structures. Then, a liquid crystal 57 is charged in the gap. Peripheral portions of the substrate structures are sealed, thereby completing an AM-LCD such as that described above.

(Embodiment 5)

Figure 7:
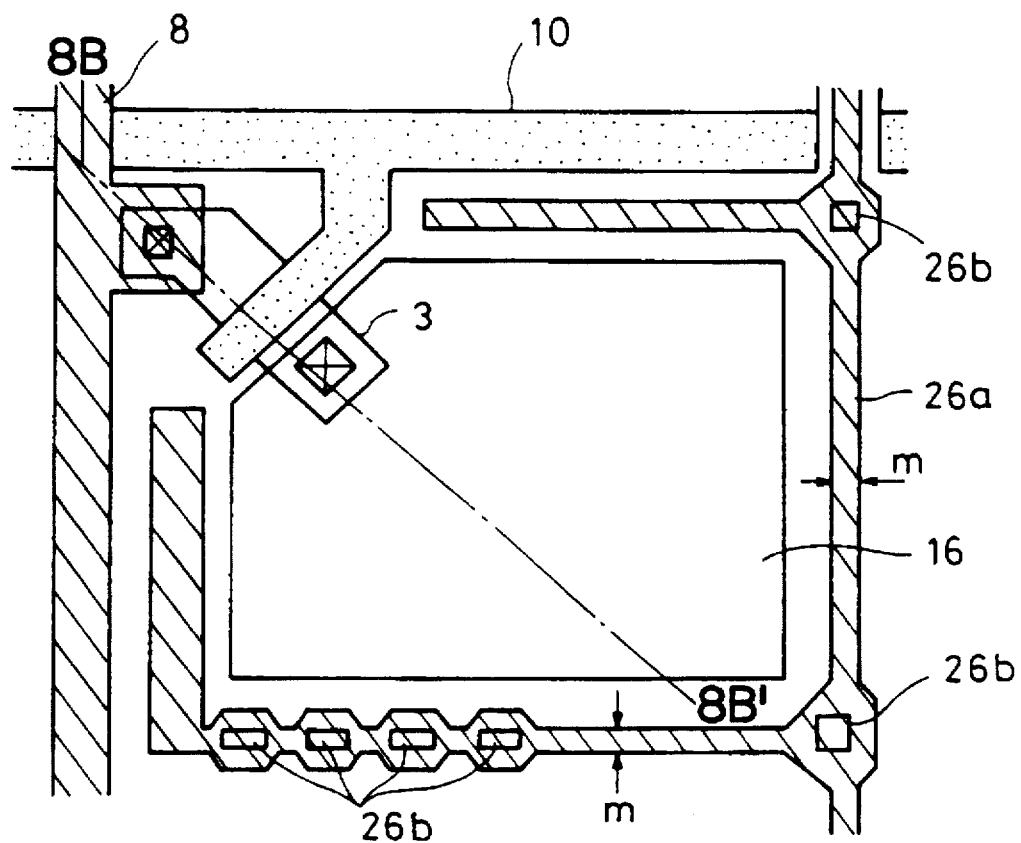
FIG. 7 is a fragmentary plan view schematically showing an AM-LCD according to a fifth embodiment of the present invention.

FIG. 7 is a fragmentary plan view schematically showing an arrangement corresponding to one of a plurality of pixels of a still further AM-LCD according to a fifth embodiment of the present invention.

The construction of the fifth embodiment is basically the same as that of the fourth embodiment, and is distinguished therefrom in the following points:

In Embodiment 5, as shown in FIG. 7, contact hole portions 26b are formed only at limited locations of a shielding wire 26; and those portions of an upper sublayer 26a and a lower sublayer 26c where no contact hole is formed have a decreased width m. This construction makes it possible to increase the pixel area, and thus, to increase the open area ratio.

(Embodiment 6)

Figure 8:
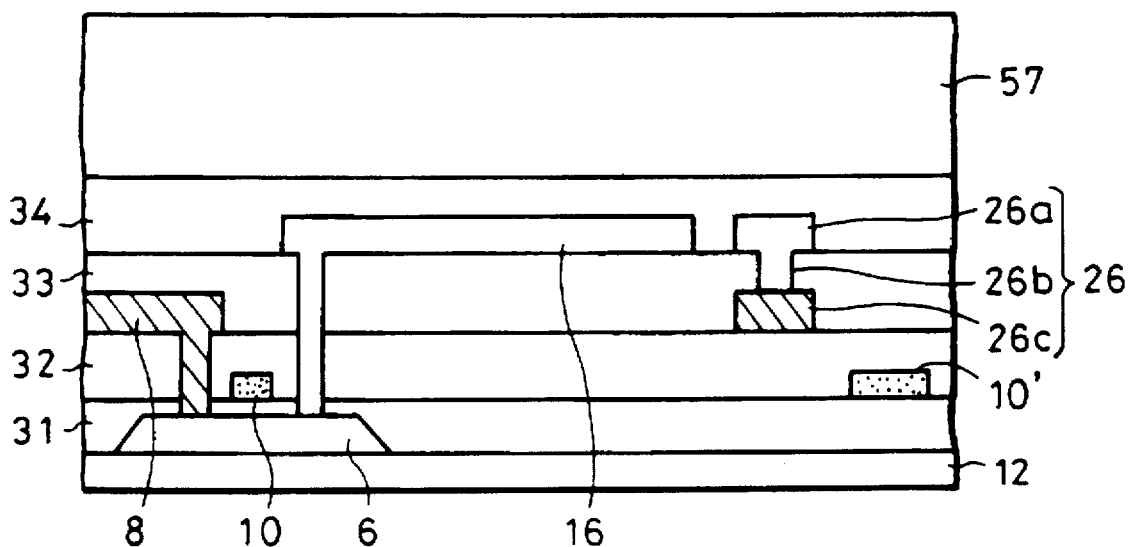
FIG. 8 is a fragmentary sectional view schematically showing an AM-LCD according to a sixth embodiment of the present invention.

FIG. 8 is a sectional view, which can be taken along line 8B—8B' shown in FIG. 7, schematically showing an arrangement corresponding to one of a plurality of pixels of a still further AM-LCD according to a sixth embodiment of the present invention.

The construction of the sixth embodiment is basically the same as that of the fourth and fifth embodiments, and is distinguished therefrom in the following points:

In Embodiment 6, as shown in FIG. 8, an upper sublayer 26a of a shielding wire 26 is formed by patterning the same conductor layer that is to form a pixel electrode 16; and a lower sublayer 26c is formed by patterning the same conductor layer that is to form a signal line 8. With this construction, since no film forming process has to be specially added for the purpose of forming a conductor layer which is to form a shielding region, it is possible to simplify the production of the liquid crystal display.

A shielding region formed in the above embodiments surrounds a greater part of the periphery of the corresponding pixel electrode. Therefore, if the shield region is formed by using a light-shielding electrically-conductive material, it is possible to prevent penetration of light into gaps between pixels (i.e., cross-talk of light) as well.

Figure 9:
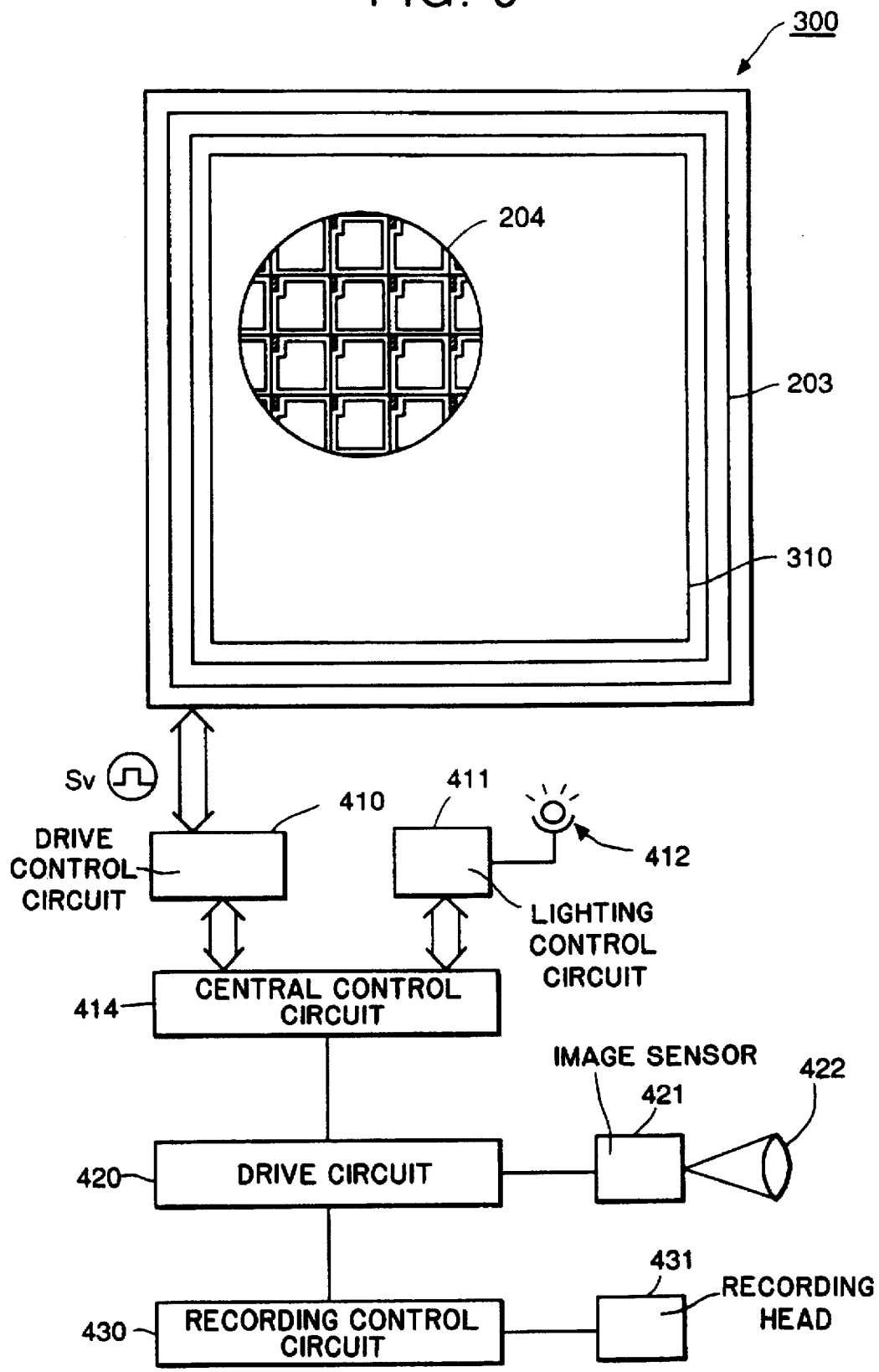
FIG. 9 schematically shows an image information processing apparatus having an AM-LCD according to the present invention.

FIG. 9 schematically shows an image information processing apparatus incorporating a liquid crystal display (LCD) according to the present invention.

The apparatus includes a LCD 300 having a display section 310 on the center thereof. In FIG. 9, an active matrix portion 204 on a substrate is depicted on an enlarged scale. Peripheral circuitry including a shift register is disposed on a peripheral area 203 around the display section 310. Although not shown, the peripheral circuitry includes horizontal drive circuits disposed above and below the display section 310, and drive circuits disposed on the left and right of the display section 310, as viewed in the drawing. The horizontal drive circuits are connected to signal lines to supply an image signal thereto. The drive circuits generates a line selection signal, and are connected to gate lines.

These drive circuits are also connected to a drive control circuit 410 mounted on another substrate, so as to be controlled thereby.

A lighting control circuit 411 includes a light source 412 and an inverter for controlling the lighting of the light source 412. The drive control circuit 410 and the lighting control circuit 411 are connected to a central control circuit 414.

The image information processing apparatus further includes an optical system 422 including a lens through which image information is input, an image sensor 421 including a photo-electric conversion element, and a drive circuit 420 for driving the image sensor 421.

In addition, the apparatus includes a recording control circuit 430 including a recording head 431 so that image information obtained by the image sensor 421 and/or image information displayed on the display section 310 can be recorded on a recording medium.

As has been described above in detail, according to the present invention, a shielding region is provided between a pixel electrode and matrix wiring elements in such a manner as to surround the pixel electrode. Therefore, it is possible to greatly reduce adverse influence of potential variations in matrix wiring elements such as gate lines and signal lines.

What is claimed is:

1. A liquid crystal display comprising:

a plurality of sets of matrix wiring elements corresponding to a plurality of pixels;

a plurality of pixel electrodes individually provided for each of said plurality of pixels;

a plurality of active elements connected to respective sets of said matrix wiring elements and corresponding to respective ones of said plurality of pixels;

a liquid crystal layer provided at said pixel electrodes to form said pixels; and a conductive layer selectively provided around each of said pixel electrodes, separate from said matrix wiring elements corresponding to each respective pixel, and maintained at a predetermined potential.

2. A liquid crystal display according to claim 1, wherein each of said pixel electrodes has a connecting portion at which the pixel electrode connects with one of said active elements, said conductive layer being provided around the entire periphery of the pixel electrode except for said connecting portion.

3. A liquid crystal display according to claim 2, wherein said conductive layer overlaps said pixel electrode with an insulating layer disposed therebetween.

4. A liquid crystal display according to claim 3, wherein said active elements are MOS transistors and wherein a part of said conductive layer is interposed between said pixel electrodes and drain regions of said active elements with an insulating layer disposed between said part of said conductive layer and said drain regions.

5. A liquid crystal display according to claim 1, wherein said conductive layer is arranged between one of said sets of said matrix wiring elements and one of said pixel electrodes.

6. A liquid crystal display according to claim 5, wherein said conductive layer includes upper and lower sublayers interconnected with each other.

7. A liquid crystal display according to claim 6, wherein said upper and lower sublayers of said conductive layer are interconnected through a plurality of contact holes.

8. A liquid crystal display according to claim 5, wherein said conductive layer includes an upper sublayer at a same level as said pixel electrode and a lower sublayer at a different level from said pixel electrode.

9. A liquid crystal display according to claim 1, wherein said conductive layer surrounding the pixel electrode of a first pixel is connected with a gate line that is connected to an active element that corresponds to another pixel different from the first pixel.

10. A liquid crystal display according to claim 1, wherein said conductive layer is maintained at a plurality of different reference potentials which occur at different points of time.

11. A liquid crystal display according to claim 1, wherein said conductive layer is formed of a light-shielding material.

12. An information processing apparatus with liquid crystal display means for displaying image information comprising:

a plurality of sets of matrix wiring elements corresponding to a plurality of pixels;

a plurality of pixel electrodes individually provided for each of said plurality of pixels;

a plurality of active elements connected to respective sets of said matrix wiring elements and corresponding to respective ones of said plurality of pixels;

a liquid crystal layer provided at said pixel electrodes to form said pixels;

a conductive layer selectively provided around each of said pixel electrodes, separate from said matrix wiring elements corresponding to each respective pixel, and maintained at a predetermined potential; and an image sensor for reading an image and producing image information therefrom to be displayed on said liquid crystal display means.

13. An information processing apparatus according to claim 12, wherein said conductive layer is formed of a light-shielding material.

14. An information processing apparatus with liquid crystal display means for displaying image information comprising:

a plurality of sets of matrix wiring elements corresponding to a plurality of pixels;

a plurality of pixel electrodes individually provided for respective ones of said plurality of pixels;

a plurality of active elements connected to respective sets of said matrix wiring elements and corresponding to respective ones of said plurality of pixels;

a liquid crystal layer provided at said pixel electrodes to form said pixels; and a conductive layer selectively provided around each of said pixel electrodes, separate from said matrix wiring elements corresponding to each respective pixels, and maintained at a predetermined potential.

15. An information processing apparatus according to claim 14, wherein said conductive layer is formed of a light-shielding material.

* * * * *

UNITED STATES PATENT AND TRADEMARK OFFICE
CERTIFICATE OF CORRECTION

PATENT NO. : 5,666,180

DATED : September 9, 1997

INVENTOR(S) : AKIRA ISHIZAKI ET AL.

It is certified that error appears in the above-identified patent and that said Letters Patent is hereby corrected as shown below:

<u>COLUMN 10</u>
   Line 26, "pixels," should read --pixel,--.

Signed and Sealed this

Seventeenth Day of March, 1998

Attest:

BRUCE LEHMAN

Attesting Officer        Commissioner of Patents and Trademarks